H. R. ROBBINS.
Means for Making Change and Delivering Tickets in Street-Cars, Stores, &c.
No. 225,872. Patented Mar. 23, 1880.
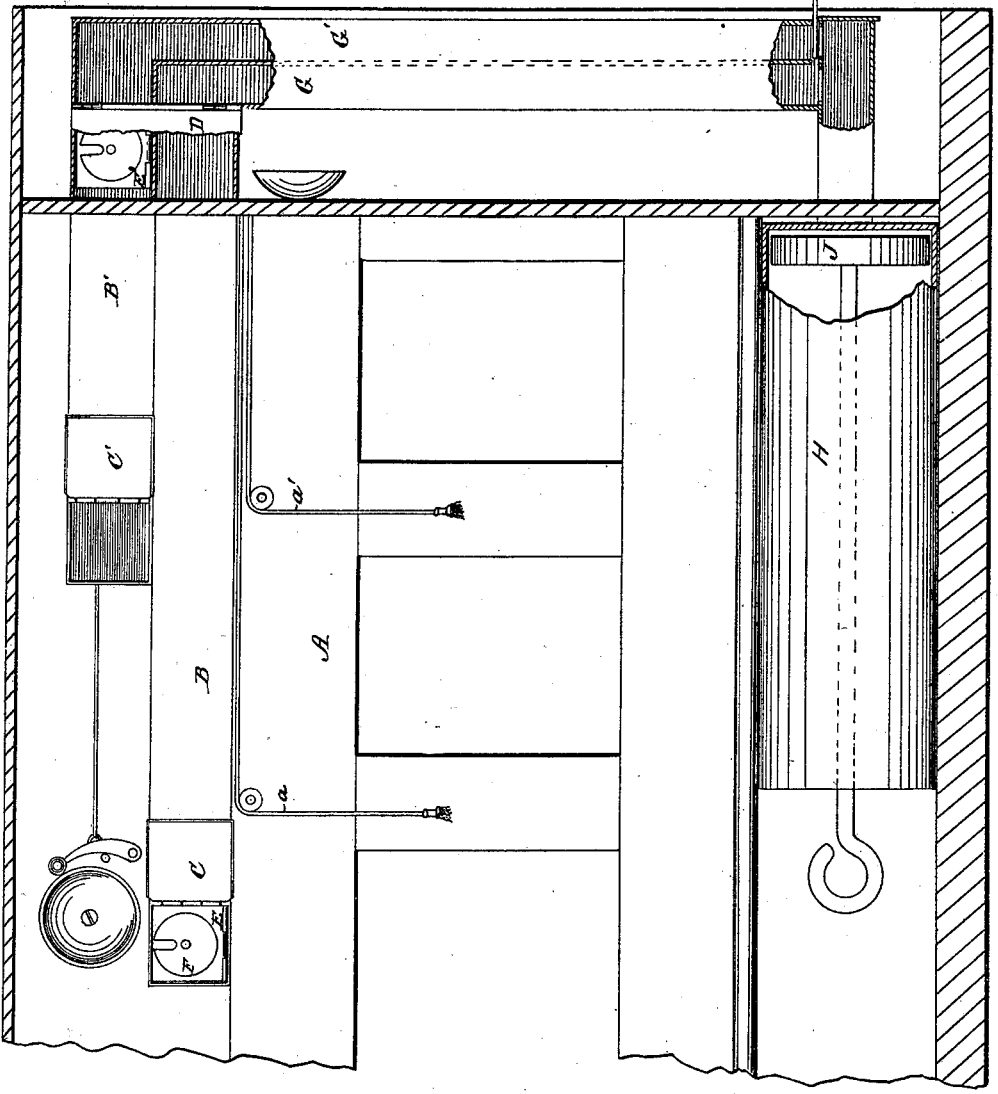
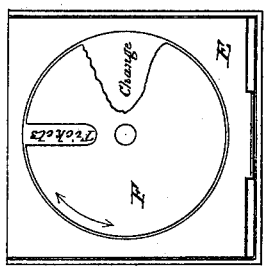
WITNESSES:
W. W. Hollingsworth
Edw. W. Byrn.
INVENTOR:
H. R. Robbins
BY
ATTORNEYS.

UNITED STATES PATENT OFFICE.

HENRY R. ROBBINS, OF BALTIMORE, MARYLAND, ASSIGNOR TO HIMSELF AND JAMES E. STANSBURY, OF SAME PLACE.

MEANS FOR MAKING CHANGE AND DELIVERING TICKETS IN STREET-CARS, STORES, &c.

SPECIFICATION forming part of Letters Patent No. 225,872, dated March 23, 1880.

Application filed November 26, 1879.

*To all whom it may concern:*

Be it known that I, HENRY R. ROBBINS, of Baltimore city, State of Maryland, have invented a new and Improved Means for Making Change and Delivering Tickets in Street-Cars, Stores, &c.; and I do hereby declare that the following is a full, clear, and exact description of the same, reference being had to the accompanying drawings, forming part of this specification, in which—

Figure 1 is a sectional inside view of a car provided with my improvements. Fig. 2 is a detail face view of one of the pneumatic carriers.

Although means have been provided in street-cars to avoid the necessity of passing to the end of the car in paying fares, this necessity still exists by reason of the fact that all passengers do not have tickets or the exact fares, and the exchange with the driver of the car in such case necessitates passing to the end of the car, to the annoyance of those seated, and at the risk of losing one's seat or being pitched or jostled by the motion of the car.

My present invention contemplates a means for enabling the driver to make change for the passengers or deliver tickets to them without requiring the passengers to pass to the end of the car; and to this end it consists in combining with a street-car two or more pneumatic tubes opening through doors at different points in the length of the car, and at the front end opening near the driver, together with suitable carriers for traversing the said tubes with the money or tickets, and an air-forcing apparatus and a valve for directing the current through any one of said tubes, whereby the transmission of tickets or change is easily effected as between the driver and passenger.

In the drawings, A represents a portion of a street-car, in which, above the windows or at any other suitable location, are arranged the horizontal pneumatic tubes B B', opening through doors C C' at different points in the length of the car. These tubes, of which there may be two or more, open in the front end of the car through a common door, D, within range of the driver. Within these tubes are arranged the carriers E E', having a falling door, which may be brought to register with the doors C C'. These carriers are packed by felting or brushes, so as to fit nicely and move easily in the tubes, and are arranged to thus move from a pressure or exhaustion produced in the tube by the driver. These carriers serve to contain the change or tickets, and in enabling the driver to know the want of the passenger a movable indicator, F, is arranged on the door of each carrier, which indicator is set by the passenger to show or point to the word "Tickets" or "Change," as the case may be.

When the passenger has placed his or her change in the carrier and closed the doors of the carrier and tube, said passenger then calls the attention of the driver to the fact by pulling one of the cords $a\ a'$, which are located near the doors of the tubes and connect with bells in the front part of the car, each of which bells, by its different tone, designates the corresponding carrier. The driver then exhausts the air from that tube and replaces the money, with the desired tickets or change, and then, by creating a pressure in the tube, sends the carrier back to the point whence it came. The passenger then having received the exact fare places it in any of the several throats opening into a conduit at different points of the car, which conduit, being inclined, carries the fare to a receiving-box near the driver, as shown in my patent granted October 14, 1879.

To permit the driver to produce the necessary suction or pressure in the tubes, and to properly direct the same through either of said tubes to the exclusion of the others, I connect the front ends of each of said tubes with vertical flues G G', leading to a compressing and exhausting apparatus, H, and I provide a damper or valve, I, which may be made to connect any one of the vertical flues G G' with the apparatus H and disconnect the rest.

For creating the alternate vacuum and pressure in the tubes, a piston, J, may be employed in the apparatus H, and be worked directly by the driver; or, instead of this, I may have an air-chamber containing compressed air stored up under pressure by the action of a pump worked by the car-wheels; or any other suitable method may be employed.

I do not furthermore confine my arrangement of tubes to their application in a street-car, as they may be employed to great advantage in large stores to avoid the necessity of cash-boys. In such case the cashier manipulates the air-currents, and the tubes open at every counter, while dumb-waiters can be used to convey articles to the basement to be wrapped or bundled and returned to the counter above—a duty usually performed by the cash-boy.

Having thus described my invention, what I claim as new is—

1. The combination of two or more tubes, terminating and opening at different points, with corresponding carriers, an apparatus for forcing air through said tubes, and a valve for directing the air-current through any one of said tubes to the exclusion of the others, substantially as described.

2. The combination of the independent pneumatic tubes B B', provided with doors C, C', and D, the air-flues G G', an air-forcing apparatus, H, and a valve or damper adapted to control and direct the currents through the tubes, substantially as described.

HENRY R. ROBBINS.

Witnesses:
WAS. H. HOBBS,
EDWD. G. STARR.